(12) United States Patent
Ravenda et al.

(10) Patent No.: US 7,736,399 B2
(45) Date of Patent: Jun. 15, 2010

(54) ELECTRICALLY-HEATED METAL VAPORIZER FOR FUEL/AIR PREPARATION IN A HYDROCARBON REFORMER ASSEMBLY

(75) Inventors: Francois Ravenda, Haucourt (FR); John E. Kirwan, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 496 days.

(21) Appl. No.: 11/593,673

(22) Filed: Nov. 7, 2006

(65) Prior Publication Data

US 2008/0107937 A1    May 8, 2008

(51) Int. Cl.
*H01M 8/06* (2006.01)
*C01B 3/26* (2006.01)
(52) U.S. Cl. .................. 48/127.1; 429/19; 423/651
(58) Field of Classification Search ............. 429/19; 423/651; 431/258–266
See application file for complete search history.

(56) References Cited

U.S. PATENT DOCUMENTS

| | | | |
|---|---|---|---|
| 6,126,908 | A | 10/2000 | Clawson et al. |
| 7,037,349 | B2 | 5/2006 | Dauer et al. |
| 2003/0070964 | A1 | 4/2003 | Docter et al. |
| 2004/0154222 | A1 | 8/2004 | Burch et al. |
| 2005/0037302 | A1 | 2/2005 | Schonert |
| 2005/0095544 | A1 | 5/2005 | Kaupert et al. |
| 2005/0191532 | A1* | 9/2005 | Kim et al. ............... 429/19 |
| 2005/0198900 | A1 | 9/2005 | Nashburn et al. |

FOREIGN PATENT DOCUMENTS

| | | |
|---|---|---|
| DE | 10211751 | 10/2003 |
| DE | 10243275 | 4/2004 |
| EP | 0878442 | 11/1998 |
| EP | 0967174 | 12/1999 |
| EP | 1571725 | 9/2005 |
| WO | 2007/042279 | 4/2007 |

OTHER PUBLICATIONS

EP Search Report Dated Feb. 21, 2008.

* cited by examiner

*Primary Examiner*—Alexa D Neckel
*Assistant Examiner*—Imran Akram
(74) *Attorney, Agent, or Firm*—Thomas N. Twomey

(57) ABSTRACT

A catalytic reformer assembly and methods of operation, including fast start-up, are provided. The reformer assembly includes an electrically-conductive metallic vaporizer having a very high surface area. At start-up of the reformer, electric current is passed through the vaporizer to heat the material by resistance heating, providing a high-temperature, high-surface area environment for fuel vaporization. Preferably, the electric current is started a few seconds before starting fuel flow. The fuel is sprayed either onto or through the heated vaporizer, preferably before the fuel is mixed with incoming air to minimize convective cooling by the air and to reduce the pressure drop in the fuel flow. As the reformer warms up, energy from the reforming process heats the vaporizer via radiation and/or conduction such that electric power is needed only during the start-up phase. A control circuit regulates the amount and duration of electric power supplied to the vaporizer.

13 Claims, 5 Drawing Sheets

ELECTRICALLY-HEATED METAL VAPORIZER FOR FUEL/AIR PREPARATION IN A HYDROCARBON REFORMER ASSEMBLY

TECHNICAL FIELD

The present invention relates to a catalytic hydrocarbon reformer for converting a hydrocarbon stream to a gaseous reformate fuel stream comprising hydrogen; and more particularly, to a fast light-off catalytic reformer; and most particularly to a method and apparatus for rapid vaporization of liquid hydrocarbon fuel during cold start-up of a hydrocarbon reformer. The present invention is useful for rapidly providing reformate as a fuel to a fuel cell, especially a solid oxide fuel cell, or to an internal combustion engine or vehicle exhaust stream to improve emissions reduction performance.

BACKGROUND OF THE INVENTION

A catalytic hydrocarbon fuel reformer converts a fuel stream comprising, for example, natural gas, light distillates, methanol, propane, naphtha, kerosene, gasoline, diesel fuel, bio-diesel or combinations thereof, and air, into a hydrogen-rich reformate fuel stream comprising a gaseous blend of hydrogen, carbon monoxide, and nitrogen (ignoring trace components). In a typical reforming process, the raw hydrocarbon is percolated with oxygen in the form of air through a catalyst bed or beds contained within one or more reactor tubes mounted in a reformer vessel. The catalytic conversion process is typically carried out at elevated catalyst temperatures in the range of about 700° C. to about 1100° C.

The produced hydrogen-rich reformate stream may be used, for example, as the fuel gas stream feeding the anode of an electrochemical fuel cell. Reformate is particularly well suited to fueling a solid-oxide fuel cell (SOFC) system because a purification step for removal of carbon monoxide is not required as is the case for a proton exchange membrane (PEM) fuel cell system.

The reformate stream may also be used in spark-ignited (SI) or diesel engines. Reformate can be a desirable fuel or fuel-additive; the reformate stream also can be injected into the vehicle exhaust to provide benefits in reducing vehicle emissions. Hydrogen-fueled vehicles are of interest as low-emissions vehicles because hydrogen as a fuel or a fuel additive can significantly reduce air pollution and can be produced from a variety of fuels. Hydrogen permits a SI engine to run with very lean fuel-air mixtures that greatly reduce production of NOx. As a gasoline additive, small amounts of supplemental hydrogen-rich reformate may allow conventional gasoline-fueled internal combustion engines to reach nearly zero emissions levels. As a diesel fuel additive, supplemental reformate may enhance operation of premixed combustion in diesel engines. Reformate can be injected into the vehicle exhaust stream to improve NOx reduction and/or as a source of clean chemical energy for improved thermal management of exhaust components (for example, NOx traps, particulate filters and catalytic converters).

Fuel/air mixture preparation constitutes a key factor in the reforming quality of catalytic reformers, and also the performance of porous media combustors. A problem in the prior art has been how to vaporize fuel completely and uniformly, especially at start-up when the apparatus is cold. Inhomogeneous fuel/air mixtures can lead to decreased reforming efficiency and reduced catalyst durability through coke or soot formation on the catalyst and thermal degradation from local hot spots. Poor fuel vaporization can lead to fuel puddling, resulting in uncertainty in the stoichiometry of fuel mixture. Complete and rapid fuel vaporization is a key step to achieving a homogeneous gaseous fuel-air mixture.

Fuel vaporization is especially challenging under cold start and warm-up conditions for a fuel reformer. In the prior art, it is known to vaporize injected fuel by preheating the incoming air stream to be mixed with the fuel, or by preheating a reformer surface for receiving a fuel spray. However, none of the prior art approaches is entirely successful in providing reliable, complete vaporization of injected liquid fuel.

What is needed is a method and apparatus for rapidly heating and vaporizing liquid hydrocarbon fuel injected into a reformer assembly, even when the overall assembly is in a cold start-up condition.

It is a primary object of the invention to prevent coking of the housing and catalyst of a hydrocarbon reformer, especially at start-up of the reformer.

SUMMARY OF THE INVENTION

A catalytic reformer assembly and methods of operation, including fast start-up, are provided. The reformer assembly includes a fuel vaporizer in the form of an electrically-conductive, metallic element having a very high surface area. At start-up of the reformer, electric current is passed through the element to heat it by resistance heating, providing a high-temperature, high-surface area environment for fuel vaporization. Preferably, the electric current is started before starting fuel flow to preheat the element. The fuel is sprayed either onto or through the heated metallic element, preferably before the fuel is mixed with incoming air to minimize convective cooling by the air and to reduce the pressure drop in the fuel flow. As the reformer warms up, energy from the reforming process heats the metallic element via radiation and/or conduction such that electric power is needed only during the start-up phase. A control circuit regulates the amount and duration of electric power supplied to the element. The invention contemplates that the heating element may remain energized after reforming has begun and/or may be continuously de-energized and re-energized as needed during the catalytic reforming.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
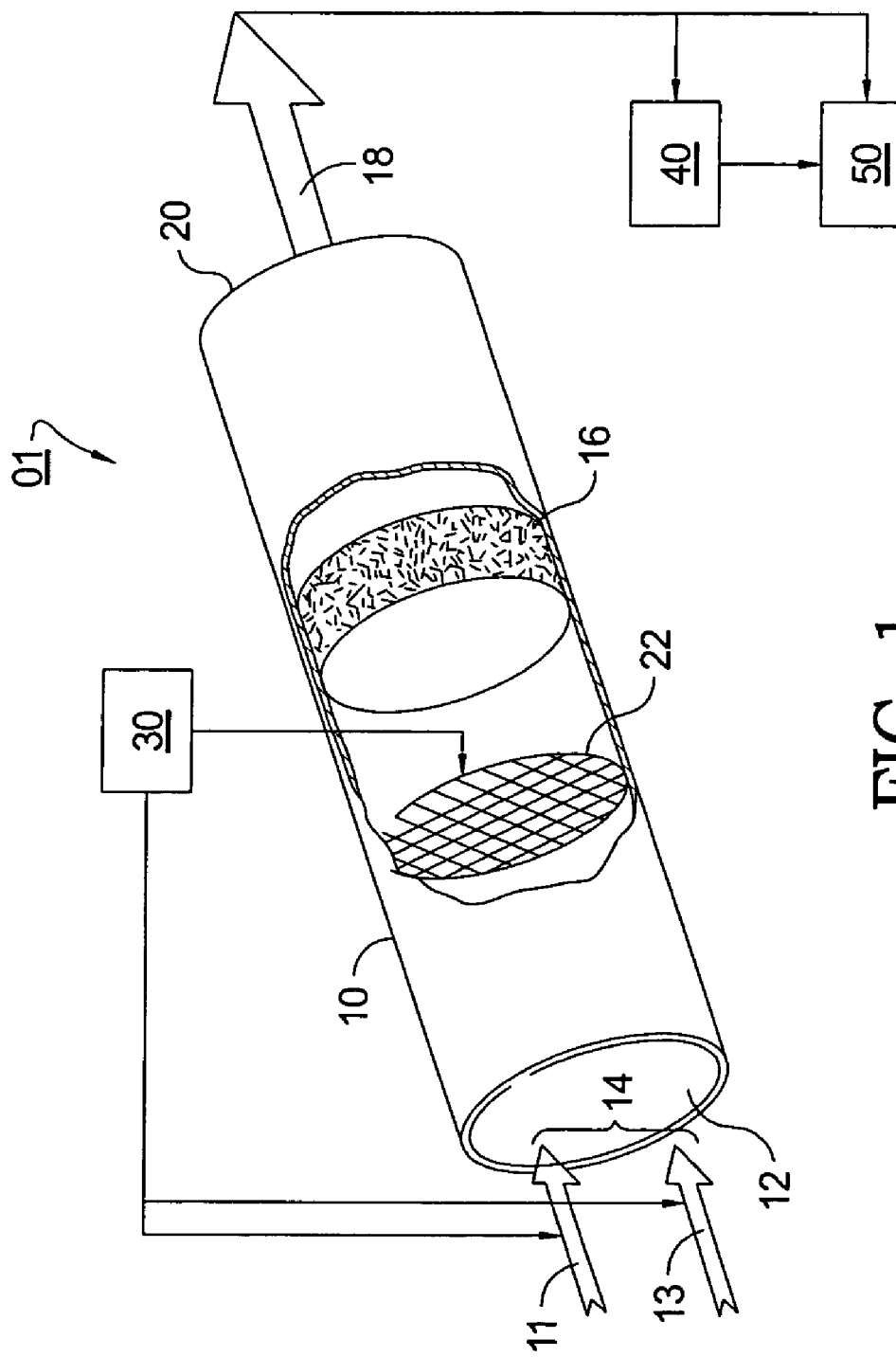
FIG. 1 is an isometric view, partially in section, of a first prior art catalytic reformer assembly.

Referring to FIG. 1, a first prior art fast light-off catalytic reformer assembly 01 includes a reactor 10 having an inlet 12 in a first end for receiving a flow of fuel 11 and a flow of air 13, shown as combined fuel-air mixture 14. Reactor 10 may be any shape, but preferably comprises a substantially cylindrical reactor tube. Reforming catalyst 16 is disposed within reactor 10. A protective coating or firewall (not shown) may be disposed about catalyst 16.

During operation, fuel-rich mixture 14 comprising air 13 and hydrocarbon fuel 11 such as natural gas, light distillates, methanol, propane, naphtha, kerosene, gasoline, diesel fuel, or combinations thereof, is converted by catalyst 16 to a hydrogen rich reformate fuel stream 18 that is discharged through outlet 20.

Ignition device 22 is disposed within reactor 10 to ignite fuel/air mixture 14 as desired. Heat generated by this reaction is used to provide fast light-off (i.e., rapid heating) of reforming catalyst 16 at start-up of the reformer. Ignition device 22 is disposed within the reactor 10 upstream of reforming catalyst 16, i.e., between inlet 12 and reforming catalyst 16. Ignition device 22 may be any device suitable for initiating exothermic reactions between fuel and air 14, including, but not limited to, a catalytic or non-catalytic substrate, such as a wire or gauze as shown in FIG. 1, for receiving electric current from a voltage source; a spark plug; a glow plug; or any combination thereof. An associated control system 30 selects and maintains the appropriate fuel and air delivery rates and operates the ignition device 22 so as to achieve fast light off of the reforming catalyst 16 at start-up and to maintain catalyst 16 at a temperature sufficient to optimize reformate 18 yield.

Prior art reformer assembly 01 has no provision for preheating of either incoming fuel 11 or air 13 and thus is not optimally directed to capability for providing either fast light-off or steady-state operating conditions for generation of reformate 18.

Figure 2:
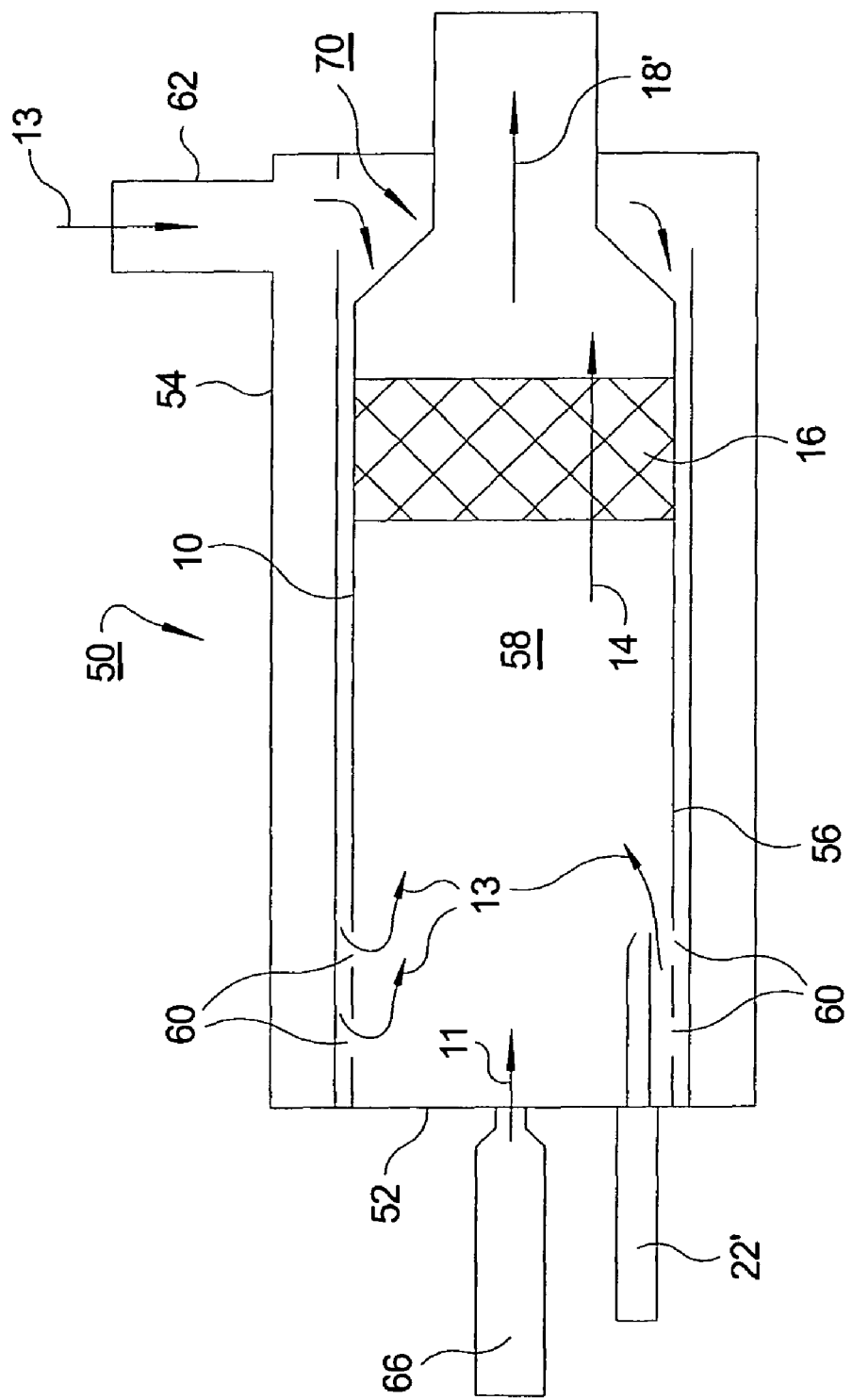
FIG. 2 is a schematic cross-sectional view of a second prior art catalytic hydrocarbon reformer assembly.

Referring to FIG. 2, a second prior art fast light-off catalytic fuel reformer 50 is seen to be adapted from reformer 01, as shown in FIG. 1, and includes means for shortening the light-off induction period of the reformer. Components thereof having identical function are identically numbered, and those having similar or improved function are identically numbered with a prime indicator. New components bear new numbers.

In second prior art reformer 50, inlet 12 is eliminated and that end of reactor 10 is blocked by end plate 52. A jacket 54 is provided concentric with reactor 10 and defining an annular chamber 56 therebetween which is closed at both axial ends. Chamber 56 communicates with reforming chamber 58 within reactor 10 via a plurality of openings 60 formed in the wall of reactor 10. Air 13 for combustion and for reforming enters reformer 50 via inlet duct 62 formed in the wall of jacket 54. Combustion fuel 11 is injected by a fuel injector 66 mounted in end 52 directly into reforming chamber 58 during combustion mode where the fuel mixes with air 13 entering from chamber 56 via openings 60. An igniter 22', preferably a spark plug or other sparking device, is disposed through end 52 of reactor 50 into chamber 58. Reforming catalyst 16 is disposed in reactor 10 downstream of the flow of mixture 14 through chamber 58. Downstream of catalyst 16 is a heat exchanger 70. Intake air 13 is passed through a first side of heat exchanger 70 and hot combustion or reformate gases 18' exiting catalyst 16 are passed through a second side, thus heating intake air 13.

Figure 3:
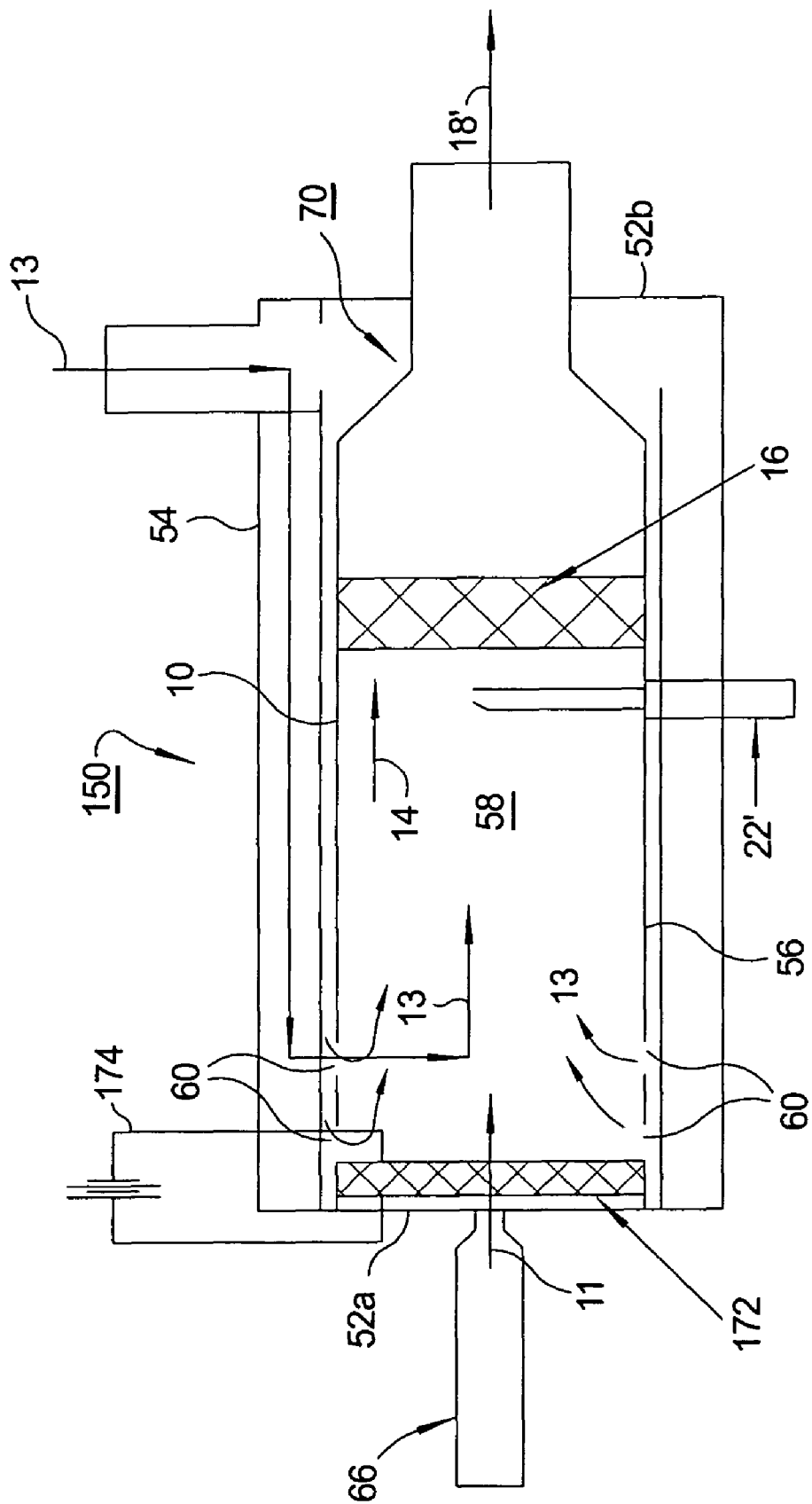
FIG. 3 is a schematic cross-sectional view of a first embodiment of a catalytic hydrocarbon reformer assembly in accordance with the invention.

Referring to FIG. 3, an improved reformer assembly 150 in accordance with the invention is structurally similar in many respects to prior art assembly 50 as shown in FIG. 2. Components thereof having identical function are identically numbered. New components bear new numbers in the 100 series.

End plate 52a closes the inlet end of reactor 10. A jacket 54 is provided concentric with reactor 10 and defining an annular chamber 56 therebetween which is closed at both axial ends by end plates 52a,52b. Chamber 56 communicates with reforming chamber 58 within reactor 10 via a plurality of openings 60 formed in the wall of reactor 10. Air 13 for combustion and for reforming enters reformer 50 via inlet duct 62 formed in the wall of jacket 54. Combustion fuel 11 is injected by a fuel injector 66 mounted in end 52a directly into reforming chamber 58 where the fuel mixes with air 13 entering from chamber 56 via openings 60. An igniter 22', preferably a spark plug or other sparking device, is disposed through a wall of reactor 10 into chamber 58. Reforming catalyst 16 is disposed in reactor 10 downstream of the flow of mixture 14 through chamber 58. Downstream of catalyst 16 is a heat exchanger 70. Intake air 13 is passed through a first side of heat exchanger 70 and hot gases (either combustion products at start-up or reformate at steady state operation) 18' exiting catalyst 16 are passed through a second side, thus heating intake air 13.

The novel improvement in reformer assembly 150 consists in a fuel vaporizer 172 disposed within reactor 10 transversely of the flow path of fuel 11 being injected into reactor 10. Vaporizer 172 preferably comprises an electrically-conductive metallic material in the form of a foam or spun/woven fibers to present a very large surface area for receiving and vaporizing liquid fuel spray from fuel injector 66. As desired, and especially at reformer start-up, an electric circuit 174 is controllably imposed across vaporizer 172 which is electrically insulated from reactor 10. The material from which vaporizer 172 is formed is selected to have a moderate ohmic resistance such that the vaporizer is resistively heated very quickly to a desired elevated operating temperature sufficient to continuously vaporize injected fuel for as long as is desired. The material must also be chemically inert at the operating environment of the reactor. Presently preferred materials include nickel and nickel alloys, although it is believed that other inert alloys can be made available which have still higher resistivity and thus even more rapid heating to even higher temperatures; and all such materials are fully comprehended by the invention.

After reformer assembly 150 is sufficiently warmed to begin fuel reforming, the heat thrown off by the exothermic reforming process can keep vaporizer 172 hot enough by radiation and conduction to continue vaporizing without requiring continued electric resistive heating.

Figure 4:
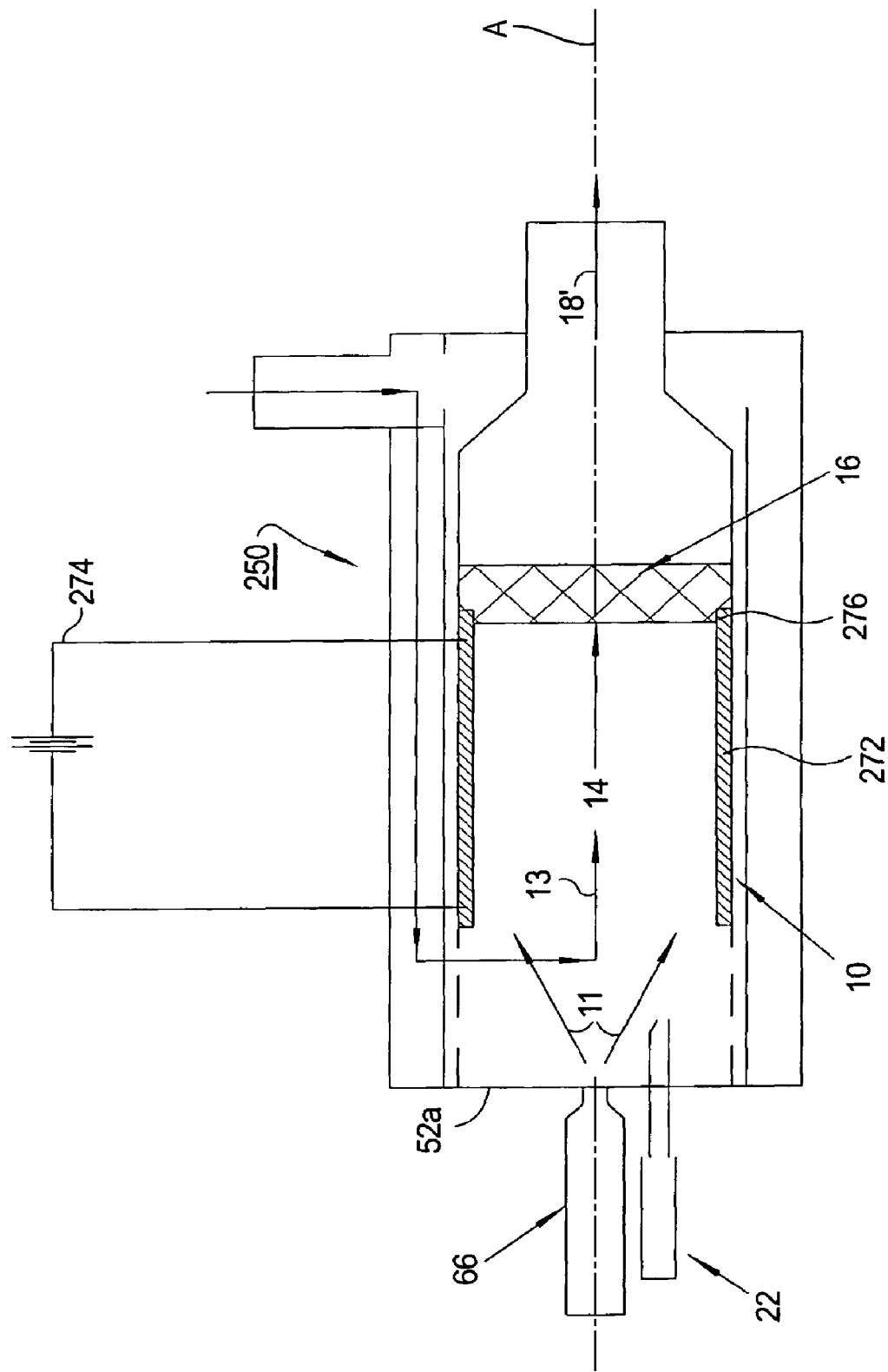
FIG. 4 is a schematic cross-sectional view of a second embodiment of a catalytic hydrocarbon reformer assembly in accordance with the invention.

Referring to FIG. 4, a second embodiment 250 of an improved catalytic hydrocarbon reformer assembly in accordance with the invention is similar in most respects to first embodiment 150. However, the vaporizer 272 is disposed in an axial, spaced relationship with longitudinal axis A along reactor (10), and is energized by circuit 274. Vaporizer 272 is also disposed in cylindrical form longitudinally along (and insulated and inbound from) the walls of reactor 10 rather than being disposed across the reactor as in first embodiment 150; and igniter 22 is returned to a prior art position in end plate 52a.

This arrangement has at least two advantages. First, vaporizer 272 may be placed in direct contact 276 with catalyst bed 16, resulting in a rapid transfer of heat by conduction from the catalyst bed to the vaporizer (whereas embodiment 150 must rely predominantly on radiative heating of vaporizer 172). Second, the cylinder of vaporizer 272 presents a very large macro-surface area for impingement of liquid fuel 11 and also shields the wall of reactor 10 from direct exposure to the fuel spray, which is known in the prior art to cause coking of the reactor.

A minor disadvantage of the arrangement shown in FIG. 4 is that the heating load on the vaporizer is increased because the vaporizer is now fully exposed to both incoming air 13 and mixture 14, both of which are cooling forces.

Figure 5:
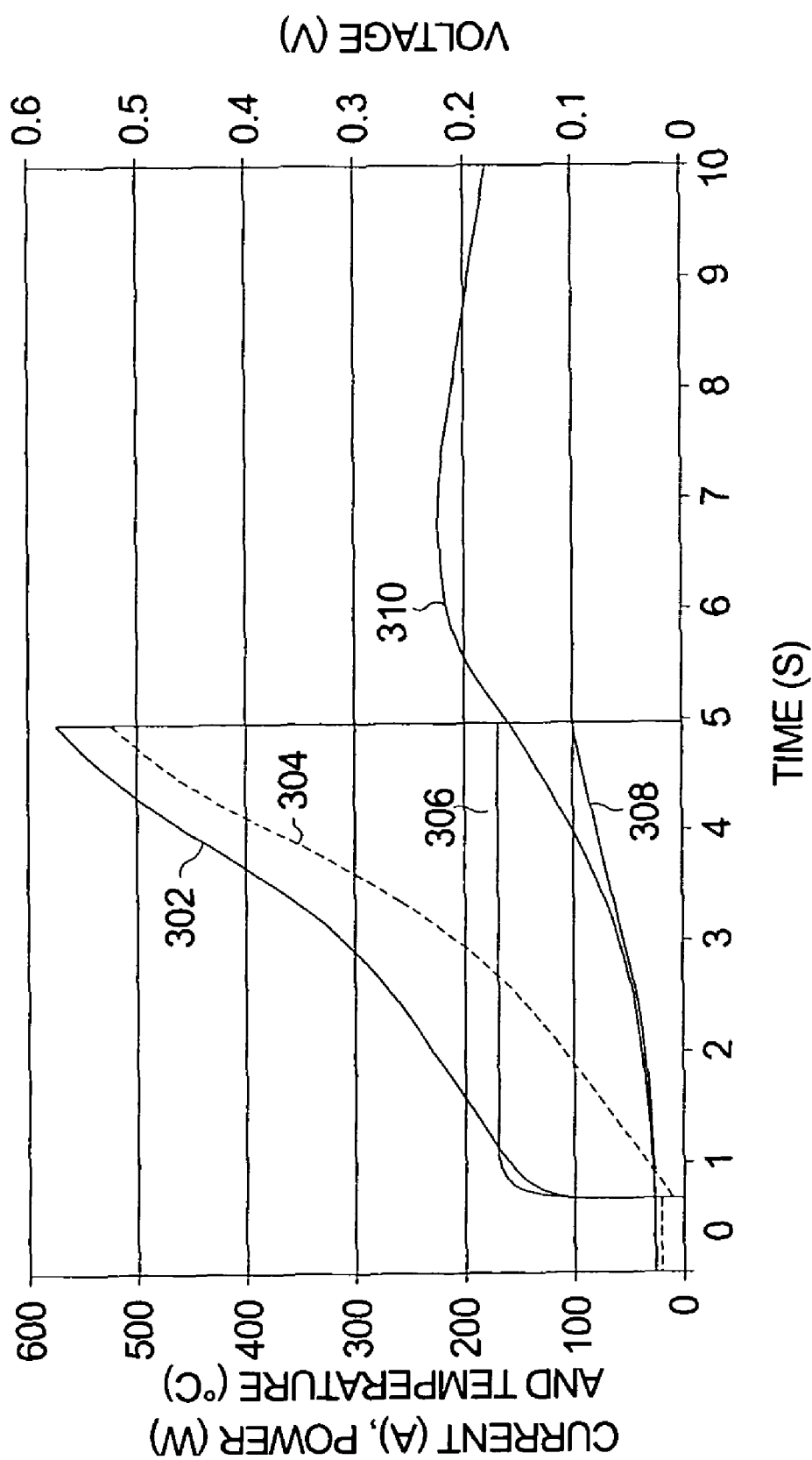
FIG. 5 is a set of graphs showing the electrical characteristics of an exemplary electrically heated metallic fuel vaporizer in accordance with the invention.

Referring to FIG. 5, electrical operation curves as a function of time from start-up are shown for an exemplary nickel foam vaporizer in accordance with the invention. Curve 302 shows a voltage increase applied across vaporizer 172,272 over 5 seconds. Curve 304 shows the corresponding temperature rise as calculated from electrical resistance of the vaporizer. Curve 306 shows the applied current, and curve 308 shows the resulting applied power. Finally, curve 310 shows the actual measured temperature rise of vaporizer 172,272; it is seen that the vaporizer can reach a temperature of at least 200° C. within 6 seconds and can maintain this temperature thereafter.

Reformer assembly 150,250 may be operated in any of several ways, depending upon a specific application or upon the operational status of the reformer.

In a first method in accordance with the invention, during start-up from a cold start, fuel 11 is spray injected by fuel injector 66 into vaporizer 172,272 wherein the fuel is instantly vaporized by contact with the hot material of the vaporizer. The vaporized fuel passes into reactor 10, is mixed with air 13 in a near-stoichiometric ratio, and ignited by igniter 22' to form hot exhaust gases 18' which immediately begin to heat the first side of heat exchanger 70. Preferably, circuit 174,274 is energized for a few seconds prior to commencing injection of fuel to preheat the vaporizer to vaporization temperature.

In one aspect of the invention, after combustion has proceeded for a few seconds, ignition by igniter 22,22' is terminated, the fuel ratio is made richer in fuel, and the unburned fuel/air mix 14 is passed into the reforming catalyst 16. Fuel flow is also terminated for a brief period to cause the preheat flame to be extinguished prior to commencing injection leading to the richer fuel mixture. Once catalytic reforming has begun, vaporizers 172,272 may be de-energized or allowed to remain energized depending upon the needs of the reformer. Also, the vaporizer may be controllably energized and de-energized during operation of the catalytic reformer.

The present fast light-off catalytic reformer assembly and methods of operation rapidly produce high yields of reformate fuel without significant coking or hot-spotting of the reactor or reforming catalyst during start-up. The produced reformate 18' may be bottled in a vessel or used to fuel any number of systems operating partially or wholly on reformate fuel. Such power generation systems for reformer assembly 150 may include, but are not limited to, engines such as spark ignition engines, hybrid vehicles, diesel engines, fuel cells, particularly solid oxide fuel cells, or combinations thereof. The present fast light-off reformer and method may be variously integrated with such systems, as desired. For example, the present fast light-off reformer may be employed as an on-board reformer for a vehicle engine operating wholly or partially on reformate, the engine having a fuel inlet in fluid communication with the reformer outlet for receiving reformate 118 therefrom.

The present fast light-off reformer and methods are particularly suitable for use as an on-board reformer for quickly generating reformate 118 for initial start-up of a system. The present reformer and methods are particularly advantageous for hydrogen cold-start of an internal combustion engine, providing a supply of hydrogen-rich reformate which allows the engine exhaust to meet SULEV emissions levels immediately from cold-start. The present fast light-off reformer and methods are also particularly suitable for use as an on-board reformer for quickly generating reformate for use to improve premixed combustion in a diesel engine. A third application for with the present fast light-off reformer and methods are suitable comprises injecting the reformate into the vehicle exhaust stream to improve NOx reduction and/or as a source of clean chemical energy for improved thermal management of exhaust components (for example, NOx traps, particulate filters and catalytic converters). Vehicles wherein a fast light-off reformer is operated in accordance with the present invention may include automobiles, trucks, and other land vehicles, boats and ships, and aircraft including spacecraft.

While the invention has been described by reference to certain preferred embodiments, it should be understood that numerous changes may be made within the spirit and scope of the inventive concepts described. Accordingly, it is intended that the invention not be limited to the disclosed embodiments, but that it have the full scope permitted by the language of the following claims.

What is claimed is:

1. A method for operating a catalytic hydrocarbon reformer, comprising the steps of:
   a) providing the hydrocarbon reformer, said reformer comprising:
      a reactor having a longitudinal axis, said reactor defining a chamber about the axis;
      a reforming catalyst disposed in said chamber, said reforming catalyst adapted to be heated during reformer operation;
      a fuel injector defined upstream from said reforming catalyst in said chamber for injecting hydrocarbon fuel into said chamber;
      an air inlet defined in the reactor allowing air to flow into said chamber upstream from the reforming catalyst;
      an igniter disposed in the reactor to initiate combustion in said chamber; an outlet defined in the reactor disposed downstream from the reforming catalyst allowing hot exhaust gases to exit the reactor; and
      a vaporizer disposed within said chamber between said fuel injector and said reforming catalyst, said vaporizer being in a parallel, spaced relationship to the axis, said vaporizer being formed of an electrically-conductive material, and the vaporizer further including an electric circuit for imposing a voltage across said electrically-conductive material causing said electrically-conductive material to be resistively heated to a vaporization temperature to vaporize hydrocarbon fuel impinged thereupon;
      wherein the vaporizer disposed in the chamber is configured as an axial vaporizer having an axial length, and the axial vaporizer has a thickness generally perpendicular to the axis, and the chamber includes an axial wall having an axial length, and the axial length of the axial vaporizer being less than the axial length of the axial wall of the chamber and greater than the thickness of the vaporizer generally perpendicular to the axis, said vaporizer being located along said axial wall;
   b) injecting the hydrocarbon fuel from said fuel injector onto said vaporizer to vaporize said fuel;
   c) forming the first mixture of the air admixed with the vaporized fuel in the chamber;
   d) igniting said first vaporized fuel/air mixture in the chamber, and passing the ignited first fuel/air mixture through the heated reforming catalyst to form hot exhaust gases that exit through the outlet; and
   e) energizing said electric circuit to cause said vaporizer to become heated to a vaporization temperature at a desired point between the providing the hydrocarbon reformer step and the igniting the first fuel/air mixture.

2. The method in accordance with claim 1 further including the step of terminating ignition of said first vaporized fuel/air mixture to terminate formation of the hot exhaust gases.

3. The method in accordance with claim 1 further including the steps of:
a) de-energizing said electric circuit;
b) adjusting a ratio of the hydrocarbon fuel to the air in said first fuel/air mixture to form a second fuel/air mixture for reforming; and
c) passing said second fuel/air mixture through said heated reforming catalyst to generate reformate.

4. The method in accordance with claim 3 further including the steps, between said de-energizing step and said adjusting step, of:
a) stopping injection of hydrocarbon fuel into said chamber;
b) waiting for a predetermined time period; and
c) re-commencing injection of hydrocarbon fuel onto said chamber.

5. The method in accordance with claim 1 further including the steps of:
a) adjusting a ratio of the hydrocarbon fuel to the air in said first fuel/air mixture to form a second fuel/air mixture for reforming;
b) passing said second fuel/air mixture through said heated reforming catalyst to generate a reformate; and
c) controllably de-energizing said electric circuit while passing said second fuel/air mixture through said heated catalyst to generate the reformate.

6. The method in accordance with claim 1 further including the steps of:
a) adjusting the ratio of the hydrocarbon fuel to the air in said first fuel/air mixture to form a second fuel/air mixture for reforming;
b) passing said second fuel/air mixture through said heated reforming catalyst to generate a reformate; and
c) controllably de-energizing and energizing said electric circuit while passing said second fuel/air mixture through said heated catalyst to generate the reformate.

7. The method in accordance with claim 1 wherein the step of injecting the hydrocarbon fuel further includes the hydrocarbon fuel being selected from a group consisting of natural gas, light distillates, methanol, propane, naphtha, kerosene, gasoline, diesel fuel, bio-diesel and combinations thereof.

8. The method in accordance with claim 1 wherein the step of providing a hydrocarbon reformer further includes said vaporizer being placed in direct contact with said reforming catalyst.

9. The method in accordance with claim 7 wherein the step of providing a hydrocarbon reformer further includes said longitudinal wall being cylindrical, and said vaporizer being cylindrical, said cylindrical vaporizer being inbound from said circular longitudinal wall.

10. The method in accordance with claim 1 wherein the step of providing a hydrocarbon reformer further includes said vaporizer being formed from at least one of nickel and nickel alloys.

11. The method in accordance with claim 1 wherein the step of energizing said electric circuit further includes said electric circuit being energized prior to injecting the hydrocarbon fuel from said fuel injector.

12. The method in accordance with claim 1 wherein said electric circuit is energized after injecting the hydrocarbon fuel from said fuel injector.

13. The method in accordance with claim 2 further including the steps of:
terminating the injection of the hydrocarbon fuel by the fuel injector into the chamber to terminate formation of the hot exhaust gases.

* * * * *